United States Patent
Majer et al.

(10) Patent No.: US 9,669,341 B2
(45) Date of Patent: Jun. 6, 2017

(54) FILTER ELEMENT AND METHOD FOR PRODUCING A FILTER ELEMENT

(71) Applicant: MANN+HUMMEL GMBH, Ludwigsburg (DE)

(72) Inventors: Tanja Majer, Ingersheim (DE); Gerhard Vilsmaier, Unterdietfurt (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 73 days.

(21) Appl. No.: 14/444,336

(22) Filed: Jul. 28, 2014

(65) Prior Publication Data
US 2014/0331627 A1  Nov. 13, 2014

Related U.S. Application Data

(63) Continuation of application No. PCT/EP2012/051254, filed on Jan. 26, 2012.

(51) Int. Cl.
| | |
|---|---|
| *B01D 46/00* | (2006.01) |
| *B01D 46/52* | (2006.01) |
| *B01D 46/24* | (2006.01) |
| *B01D 39/08* | (2006.01) |
| *B32B 37/12* | (2006.01) |

(52) U.S. Cl.
CPC ......... *B01D 46/0005* (2013.01); *B01D 39/08* (2013.01); *B01D 46/0001* (2013.01); *B01D 46/2411* (2013.01); *B01D 46/521* (2013.01); *B01D 46/523* (2013.01); *B01D 46/525* (2013.01); *B32B 37/1207* (2013.01); *B32B 2037/1215* (2013.01); *B32B 2037/1269* (2013.01)

(58) Field of Classification Search
CPC .. B01D 46/10; B01D 46/2411; B01D 46/521; B01D 46/523; B01D 46/525; B01D 46/526; B01D 46/527
See application file for complete search history.

(56) References Cited

U.S. PATENT DOCUMENTS

| | | | | |
|---|---|---|---|---|
| 4,217,435 A * | 8/1980 | McConnell | ............ | C09J 177/00 525/425 |
| 4,363,853 A * | 12/1982 | Imamura | ............... | C08G 63/181 428/349 |
| 5,236,480 A * | 8/1993 | Svensson | ............... | B01D 46/10 55/385.2 |
| 5,620,505 A * | 4/1997 | Koch | ................. | B01D 46/0024 210/493.3 |
| 5,783,086 A * | 7/1998 | Scanlon | ................ | A47L 7/0042 210/416.1 |
| 8,328,896 B2 * | 12/2012 | Ter Horst | ............... | B01D 46/10 55/495 |
| 2003/0172633 A1 * | 9/2003 | Duffy | .................. | B01D 29/012 55/495 |
| 2004/0065066 A1 * | 4/2004 | Mertz | ................. | B01D 46/0001 55/486 |
| 2005/0284116 A1 * | 12/2005 | Duffy | ................ | B01D 46/0001 55/497 |
| 2006/0005517 A1 * | 1/2006 | Sundet | ............... | B01D 46/0001 55/497 |
| 2008/0086990 A1 * | 4/2008 | Kuempel | ........... | B01D 46/2411 55/357 |
| 2008/0132625 A1 * | 6/2008 | Niehaus | ............... | C08K 5/0008 524/285 |
| 2009/0026129 A1 * | 1/2009 | Brenneis | ............. | B01D 29/012 210/493.5 |
| 2011/0048228 A1 * | 3/2011 | Handley | ............ | B01D 46/0068 95/45 |
| 2012/0223008 A1 * | 9/2012 | Mbadinga-Mouanda | | B01D 46/521 210/493.5 |
| 2013/0133517 A1 * | 5/2013 | Gehwolf | ............ | B01D 46/0001 95/285 |
| 2013/0139947 A1 * | 6/2013 | Gehwolf | ................ | C09J 167/02 156/60 |
| 2013/0186566 A1 * | 7/2013 | Lotz | ..................... | C09J 123/142 156/334 |

FOREIGN PATENT DOCUMENTS

| | | |
|---|---|---|
| CN | 2352239 Y | 12/1999 |
| CN | 201253524 Y | 6/2009 |
| CN | 201310731 Y | 9/2009 |
| CN | 201969424 U | 9/2011 |
| WO | 9935189 A2 | 7/1999 |
| WO | 2012013647 | 2/2012 |

* cited by examiner

*Primary Examiner* — Robert Clemente
(74) *Attorney, Agent, or Firm* — James Hasselbeck

(57) ABSTRACT

A filter element has a filter body of at least one layer of a flat web-shaped filter medium, separating a raw side from a clean side of the filter element. A hot melt system is provided and the filter body is glued together by the hot melt system. The hot melt system has a hot melt mixture that is made up of 15-85% by weight of a first hot melt that is polyester-based and 15-85% by weight of a second hot melt that is polyamide-based. The first hot melt and the second hot melt together amount to 100% by weight of the hot melt mixture. The hot melt mixture constitutes a proportion of more than 75% by weight of the hot melt system. The remainder of the hot melt system is made up of fillers, pigments, tackiness-imparting resins, and hot melts based on a polycondensate.

33 Claims, 9 Drawing Sheets

FILTER ELEMENT AND METHOD FOR PRODUCING A FILTER ELEMENT

CROSS-REFERENCE TO RELATED APPLICATIONS

This application is a bypass continuation application of international application No. PCT/EP2012/051254 having an international filing date of 26 Jan. 2012 and designating the United States, the entire contents of the aforesaid international application being incorporated herein by reference.

BACKGROUND OF THE INVENTION

The invention concerns a filter element, in particular for filtration of fluids of internal combustion engines, for example, intake air, lubricant oil, fuel or urea-water solution, a method for its production, and the use of a hot melt for gluing filter elements.

DE 1299230 discloses a filter whose folds are connected by means of individual hot melt dots.

In such filter elements there is the problem that upon application of the hot melts, in particular for a bead-like application with elongate hot melt beads or for dot-shaped application, for example, by means of applicator nozzles, applicator rollers etc., hot melt strings are formed between the application equipment and the ends of the hot melt beads; they quickly cool down and harden and remain on the filter in the application area. The problem occurs particularly frequently upon closing the applicator nozzles. This can be particularly disadvantageous in case of an adhesive connection at the clean side of the filter element because in operation pieces of cold hot melt strings may become detached and entrained by the fluid flow. This can be disadvantageous in particular in the filtration of intake air of internal combustion engines.

For gluing zigzag-shaped folded filter elements hot melts are used regularly. Non-reactive hot melts are products which are free of solvent and at room temperature are more or less solid and in the hot state are applied onto a surface to be glued and produce upon cooling the adhesive connection. This group of adhesives is also known as hot melt and is based on various chemical raw materials. DIN EN 923 defines hot melt as a thermally meltable adhesive system that after cooling develops cohesion. Melting points are usually between 80° C. and 250° C. From the prior art various non-reactive hot melts on the basis of polyesters or polyamides are known, for example, Macromelt 2030, 6208 from Henkel, WEVO T 570, P 165 from WEVO Chemie, or TH 207, TH 111 from Bostik. From Müller and Rath, Formulierung von Kleb- and Dichtstoffen, Hannover: Vincentz Network, 2004, further hot melts are known. Upon application of the hot melts, in particular upon interrupting the application by means of applicator nozzles, hot melt strings are produced regularly which form between the applied adhesive and an applicator nozzle and optionally may tear off (stringing).

The invention has the object to provide a filter element, glued by means of a hot melt with a reduced amount of hot melt strings, and a method for its production.

SUMMARY OF THE INVENTION

The object is solved by a filter element, in particular for filtration of gases and liquids, in particular for the filtration of intake air, fuel, oil or urea-water solution of internal combustion engines or for filtration of processing liquids of metal processing machines, in particular eroding machines, comprising a filter body of at least one layer of a flat web-shaped filter medium which separates a raw side from a clean side, for example, a filter bellows that is folded in a zigzag shape and formed from a flat filter medium. The filter bellows can be embodied as a rectangular zigzag-shaped filter bellows or an annularly arranged star-shaped folded filter bellows. Alternatively, as a filter body a filter medium that forms in particular alternatingly closed channels can be employed wherein the filter body is formed by winding or layered stacking and gluing of a semi-finished product comprising two filter medium layers, wherein the semi-finished product comprises a flat layer and a corrugated layer placed thereon.

The filter element according to the invention is glued by means of a hot melt system. According to the invention, the hot melt system comprises a hot melt mixture wherein the hot melt mixture comprises 15-85% by weight, in particular 30-70% by weight, of a first hot melt that is polyester-based, and 15-85% by weight, in particular 30-70% by weight, of a second hot melt that is polyamide-based. According to the invention, the weight proportions of the first and of the second hot melt preferably together result in 100% by weight of the hot melt mixture.

In this context, the hot melt mixture constitutes a proportion of 75-100% by weight (preferably almost or precisely 100% by weight) of the hot melt system wherein the remainder is comprised of fillers, such as chalk, and/or pigments, such as titanium dioxide as a white pigment, and/or a tackiness-imparting resin and/or at least a further hot melt on the basis of polycondensate.

As filter media, for example, cellulose media, media of meltblown fibers, fiber nonwovens or combinations thereof constructed in layers can be used.

It was surprisingly found that upon use of the aforementioned hot melt system a filter element can be produced which is glued by means of hot melt beads which, in comparison to other such filter elements, exhibits a significantly reduced number of hot melt strings.

In one embodiment, the filter element is glued with at least one adhesive bead. The adhesive bead(s) can be uninterrupted or interrupted, in particular regularly or irregularly interrupted. The adhesive beads extend in particular perpendicularly to the fold edges on the filter medium but can also be positioned at an angle to the fold edges. In analogy, in the filter element which is formed of a flat layer and a corrugated layer, between the flat layer and the corrugated layer of the semi-finished product and/or between the flat layer and the corrugated layer which upon winding come into contact with each other, at least one, in particular at least two, in particularly regularly or irregularly interrupted adhesive beads of a hot melt system are arranged.

In one embodiment, the filter body has on at least one surface of the flat web-shaped filter medium a sealing, uninterrupted adhesive bead of the hot melt system which glues the filter body in such a way that the raw side and the clean side of the filter element are separated seal-tightly from each other.

In one embodiment, the filter body is annular and formed of a zigzag-shaped folded filter bellows of a flat filter medium web that is fluid-tightly closed in an annular shape such that two oppositely positioned end sections of the filter medium web are seal-tightly connected, in particular parallel to the fold edges, by an adhesive bead of the hot melt system which extends along the end edges at the end sections.

In one embodiment, the adhesive bead extends between the end edges and the fold edges which are positioned closest to the two end edges.

In one embodiment, the adhesive bead extends centrally between the end edges and the fold edges which are closest to the two end edges.

In one embodiment, the end sections are pressed together at the adhesive bead, in particular with a corrugated profiling. In this way, a particularly tight and durable connection is provided.

In one embodiment, the adhesive bead extends along the entire length of the end edges.

In one embodiment, at the axial end faces of the annular filter body, end disks are arranged which close off seal-tightly the end faces such that the raw side is separated from the clean side, wherein the adhesive bead is connected seal-tightly with the end disks. The latter can be configured as injection-molded plastic parts and fused with the filter bellows or glued by means of an adhesive. Moreover, end disks are conceivable which are formed of a material which swells and cures under heat action and which upon, with use of heat, upon swelling bond non-detachably with the filter bellows.

In one embodiment, according to a method in particular according to the invention, the zigzag-shaped filter material is formed to a bellows in that end sections or terminal fold sections are connected to each other by the adhesive bead (sealing bead). Due to the zigzag-shaped folding, a larger surface area of the filter material in the filter bellows results.

In one embodiment of a filter bellows for a filter element, the two terminal fold sections are connected with each other by the sealing bead and sealed. From the interior of the fold bellows no fluid can escape through the end sections connected to each other. The end sections which are connected to each other are in particular pressed together according to the invention while the sealing bead of hot melt is still liquid, preferably until the hot melt hardens. The pressing action is realized preferably by means of profiled profiles or tongs which have a corrugated or zigzag-shaped profiling extending parallel to the terminal fold sections. In this way, appropriately deformed end sections are produced and a more durable connection is produced. The zigzag-shaped filter material sheet is preferably folded over such that the two terminal fold sections are resting flat on each other. In this context, the end edges preferably form a common terminating edge.

The filter element according to the invention is, for example, embodied as an oil or fuel filter comprising a filter element as described herein. The fold bellows which is formed of zigzag-shaped filter material is secured between two covers. In the fold bellows two end sections are connected fluid-tightly with each other by means of the sealing bead.

The upper cover is preferably provided with a connector that has an opening. Fluid to be filtered can flow through the folds of the filter material and can exit the filter material through the opening. Alternatively, a flow in opposite direction is conceivable. Of course, further filter devices are conceivable. For example, the filter element can be introduced into a filter cup or an angular bellows can be formed. The covers are also referred to as end disks. Also, cast covers of foamed polyurethane are conceivable. The sealing bead advantageously is in seal-tight connection with the covers so that a reliable sealing action between raw side and clean side is realized. In case of a fused cover, of a polyurethane cover, or a cover of a material which under heat action swells and cures, the ends of the sealing bead are embedded in the cover; in case of a cover which is glued to the filter bellows, the ends of the sealing bead are embedded in the adhesive layer between cover and filter bellows or connected therewith.

In the following, advantageous features of a particularly inventively produced filter element according to an inventive method are presented. In a first step, a flat filter material sheet is provided. The filter material sheet is, for example, of a rectangular shape. The oppositely positioned end sections are to be connected to each other so that a tubular filter element body is formed. Accordingly, in particular the end edges are consequently placed onto each other. In order to form a zigzag-shaped fold bellows, the filter material sheet is first pleated or folded. Various methods for zigzag-shaped folding of filter materials are known. It is possible, for example, to use oppositely engaging folding knives that produce folds of different orientation in the filter sheet. Also, rotating knife arrangements are known. After folding, the end sections of the filter material sheet correspond to the terminal fold sections.

In an alternative embodiment of the filter body, the latter is formed of a semi-finished product of two layers of a filter medium placed onto each other, wherein the first layer is embodied as a flat layer and the second layer is embodied as a corrugated layer. The semi-finished product is wound or stacked in layers so that between the layers channels are formed allowing flow therethrough, wherein the two layers each are connected to each other by means of at least one uninterrupted adhesive bead (sealing bead) of the hot melt system. The adhesive bead extends on a flat side of the flat layer along a first edge of the flat layer and along an edge of the corrugated layer between the flat layer and the corrugated layer perpendicularly relative to the corrugations such that the channels allowing flow therethrough are seal-tightly closed at a first end.

In one embodiment, a second uninterrupted adhesive bead of the hot melt system is provided through which the two layers are connected with each other, wherein the second adhesive bead (sealing bead) extends on the second side of the flat layer that is positioned opposite to the first flat side along a second edge that is positioned opposite the first edge of the flat layer between the flat layer and the corrugated layer perpendicularly to the corrugations such that the channels allowing flow therethrough are seal-tightly closed at a second end. In this way, a filter body with alternatingly closed channels is formed.

In one embodiment, the filter body is made of a semi-finished product of two layers of a filter medium which are stacked onto each other and wound, wherein the first layer is embodied as a flat layer and the second layer is embodied as a corrugated layer so that between the two layers channels are formed allowing flow therethrough, wherein the two layers are connected to each other by at least one adhesive bead of the hot melt system. The adhesive bead (adhesion bead) extends in this context on a side of the flat layer which is facing the corrugations transversely, in particular, perpendicularly to the corrugations such that the corrugations peaks which are contacting the flat layer are glued to the flat layer, wherein the height of the adhesive bead is less than the height of the corrugations so that the channels allowing flow therethrough are not closed off by this adhesive bead. An application onto the corrugation peaks is conceivable also.

In an advantageous embodiment, the filter body comprises at least one of the aforementioned adhesion beads as well as two of the aforementioned sealing beads by means of which a filter body with alternatingly closed channels is formed. The sealing beads form in particular closure plugs for the channels.

In another embodiment, the filter body is formed of a zigzag-shaped folded filter bellows of a flat filter medium sheet wherein along the terminal edges of the filter medium sheet extending perpendicularly to the fold edges an uninterrupted adhesive bead of the hot melt system is provided which closes off laterally the erected folds such with formation of a fold pocket such that raw side and clean side of the filter element are seal-tightly separated from each other.

In one embodiment, the fold edges on at least one side of the filter bellows form a plane so that a one-sided or two-sided flat filter element is formed.

In one embodiment, a plane which is formed by the fold edges is surrounded by a, in particular cast, seal which circumferentially extends about the plane, in particular of a foamed polymer, in particular polyurethane, for seal-tight separation of the raw side from the clean side in a filter housing.

In one embodiment, the filter body is formed of a zigzag-shaped folded filter bellows of a flat filter medium sheet, wherein the filter bellows has an adhesive bead which is applied onto the filter bellows uninterrupted across several fold edges, in particular perpendicularly to the fold edges, in a plane of the filter bellows formed by the fold edges, in particular in order to stabilize the filter bellows and to keep constant the spacing between the neighboring fold edges in operation.

In one embodiment, the filter bellows is formed of a zigzag-shaped folded filter bellows of a flat filter medium sheet with inflow-side fold edges and outflow-side fold edges and comprises a preseparation layer, in particular of a nonwoven, which is resting on the surface which is formed by the inflow-side fold edges, wherein the filter body by means of the hot melt system is glued to the preseparator layer.

In one embodiment, the adhesive connection with the preseparator layer is realized by adhesive dots or adhesive beads, in particular by at least two adhesive beads.

In one embodiment, the filter body is comprised of a zigzag-shaped folded filter bellows of a flat filter medium sheet, wherein the zigzag-shaped extending terminal edges of the filter medium sheet define two end faces, wherein on at least one of the end faces a lateral band of a fabric or a nonwoven is applied which is glued on by means of a wide areal adhesive bead of the hot melt system.

In one embodiment, the lateral band is seal-tightly glued by means of the wide areal adhesive bead with the end face in such a way that the raw side is separated from the clean side.

In one embodiment, the lateral band has two sections which overlap each other wherein the two sections in the area in which they overlap are glued together with an adhesive bead of the hot melt system.

In one embodiment, the adhesives bead is a wide areal adhesive bead and preferably is applied by means of a wide slot nozzle.

In one embodiment, the filter element comprises a zigzag-shaped folded filter medium which separates a raw side from a clean side and alternatingly has fold tips and fold bottoms, wherein in the intermediate fold spaces in particular elongate stabilization beads of the hot melt system are arranged, which alternatingly extend between the fold tips and the fold bottoms, wherein at the raw side, and preferably in particular also at the clean side, of the filter medium at least two adhesive beads are arranged parallel to each other and perpendicular to the direction of the fold edges on the filter element, respectively, wherein the adhesive beads on the raw side and/or the clean side are interrupted at regular spacings.

In this context, the start and end points of the interruptions of the adhesive beads are preferably aligned along a plurality of straight lines.

Stabilization beads are referred to as elongate when their length in the application direction is 5 times longer, preferably 10 times longer, than their width.

In one embodiment, the stabilization beads in particular comprise regularly spaced-apart hot melt dots applied in a dot shape.

In one embodiment, the stabilization beads comprise elongate, continuously applied sections that in particular are interrupted regularly by penetrations.

In one embodiment, the start and end points of the interruptions of the stabilization beads are aligned along a plurality of straight lines that extend parallel to each other and form with the fold edges an angle of 10-80°, preferably 45+/−15°.

In one embodiment, the stabilization beads at the clean side and/or raw side have an interruption of the adhesive bead which surrounds the fold tip at the clean side or raw side.

In one embodiment, the stabilization beads at the clean side and/or raw side have an interruption of the adhesive bead which surrounds the fold bottom at the clean side or raw side.

In one embodiment, at least one, preferably all, stabilization beads at the raw side are positioned directly opposite of one/the adhesive bead(s) at the clean side.

In one embodiment, the interruptions of the oppositely positioned stabilization beads at the raw side and the clean side do not overlap each other.

In one embodiment, the start and end points of the interruptions of the stabilization beads extend along at least two sets of straight lines, wherein each set of straight lines comprise straight lines parallel to each other, wherein the corresponding straight lines intersect each other on the filter medium so that an arrow-shaped or zigzag-shaped course of the interruptions of the stabilization bead on the filter medium is formed.

In one embodiment, the start and end points of the interruptions of the stabilization beads are defined by sets of curves instead of sets of straight lines, wherein the curves in particular have the same shape but are shifted relative to each other in a direction perpendicular (+/−30°) to the fold edges.

In one embodiment, the set of curves comprises circle sections or ellipse sections, sine wave shapes or other regular wave shapes.

In one embodiment, the spacing between two sequential interruptions, i.e., the length of a continuous stabilization beads is longer than at least one, preferably both, interruptions that adjoin the continuous adhesive bead section.

In one embodiment, the length of at least one interruption, in particular of interruptions positioned between fold tip and fold bottom, is 5-20 mm, preferably 20-40 mm, alternatively 40-60 mm.

In one embodiment, the length of continuous sections of the stabilization beads is at least 5-20 mm, preferably 20-40 mm, alternatively greater than 40 mm.

Advantageously, the sizes of the interruptions and of the continuous sections of the stabilization beads are selected such that a satisfactory stability of the filter medium is achieved and advantageously at the same time a communication between the fold sections separated by the adhesive beads is enabled.

In one embodiment, the filter element comprises a zigzag-shaped folded filter bellows which has two end faces arranged perpendicular to the fold edges, wherein the end faces are seal-tightly closed off by means of glued or fused end disks, a potting compound (in particular foamed polyurethane) or a continuous hot melt bead of the hot melt system extending along the zigzag-shaped extending terminal edges at the end faces of the filter bellows, wherein the filter element in the area between the end faces is glued by at least one, in particular at least two, in particular regularly or irregularly interrupted adhesive beads as stabilization beads.

In one embodiment, the filter element is formed as a ring-shaped filter element with ring-shaped end disks, wherein one of the end disks is preferably of a closed configuration and the second end disk comprises an inner fluid flow opening about which an axial or radial seal is arranged for sealing relative to a housing fluid channel, in particular the outlet channel upon radial flow from the exterior to the interior.

In another embodiment, the filter element has a rectangular shape with a raw-side inflow side and a clean-side outflow side. The filter element is formed by a filter medium that is folded multiple times, wherein the folds extend between the inflow side and the outflow side, i.e., there are fold tips at the inflow side and the outflow side. The lateral surface of the filter element through which no flow passes are surrounded by a nonwoven, in particular a polyester nonwoven, which on the side which is facing the filter element is provided with a hot melt layer formed in particular with the hot melt system according to the invention. This hot melt layer produces an areal adhesive connection of the polyester nonwoven with the filter element wherein also the end faces of the filter bellows are sealed off.

In one embodiment, the filter element comprises a main frame and an auxiliary frame wherein the main frame has an axial seal which seals in the direction of the outflow side and is inserted into a groove of the main frame or a groove between main frame and lateral surfaces.

In one embodiment, the auxiliary frame is advantageously connected with the lateral surfaces by an adhesive connection and has radial surfaces and/or axial surfaces for supporting the filter element in a filter housing.

In one embodiment, on the lateral surfaces of the filter medium through which no flow passes, a plastic frame is applied by means of a hot melt connection which is formed in particular by means of the hot melt according to the invention, wherein, at the end faces, the sealing action of the end face is also realized by the hot melt.

In one embodiment, openings are provided in the plastic frame on the terminal sides and/or the end faces.

In one embodiment, the plastic frame supports at the inflow side an axial seal which can be brought into contact with a sealing surface of a filter housing for sealing between raw side and clean side.

In one embodiment, a grip is provided which is connected with the plastic frame and which serves for better handling of the filter element.

The object is further solved by a method for producing a filter element, the method comprising the steps of:
a. Melting a hot melt mixture, in particular in an extruder, the hot melt mixture comprising
  i. 15-85% by weight of a first hot melt that is polyester-based,
  ii. 15-85% by weight of a second hot melt that is polyamide-based,
  wherein the weight proportions of the first and of the second hot melt together result in 100% by weight of the hot melt mixture, wherein the hot melt mixture constitutes a proportion of more than 75% by weight of the hot melt system, wherein the remainder is comprised of fillers, such as chalk, and/or pigments, such as titanium dioxide as a white pigment, and/or a tackiness-imparting resin and/or at least one further hot melt on the basis of a polycondensate,
b. In particular dynamic mixing of the two hot melts present in particular in powder form or granular form, in particular with generation of shearing forces in the melt, in particular in an extruder, to a hot melt mixture,
c. Application of the melted hot melt mixture onto a web-shaped filter medium in at least one adhesive bead, in particular by means of an applicator nozzle,
d. Hardening of the at least one adhesive bead with bonding of sections of a filter medium web of the filter medium with other sections of the same filter medium web or with sections of a second, in particular corrugated, filter medium web and/or with a preseparator nonwoven.

This has the advantage that a filter element glued together by means of hot melt can be produced which, in comparison to other known filter elements glued together by means of hot melt, has a reduced number of hot melt strings.

In one embodiment, the hot melts, in particular present in powder form and/or granular form, are mixed before heating and subsequently heated and melted.

In one embodiment of both methods, further mixing, heating, and melting of the hot melts is carried out in an extruder.

This has the advantage that near the application site a very good mixing of the hot melts is achieved. Separation in the melted state is thus reduced. In one embodiment, a pump is arranged between extruder and applicator nozzle.

In one embodiment, the melted hot melt system is foamed with a gas, in particular nitrogen, air, $CO_2$ or the like.

In one embodiment, the application of the adhesive is carried out directly subsequent to mixing, in particular for avoiding separation.

In one embodiment of the method, as a final step, in particular without intermediate cooling, a bead-shaped regularly or irregularly interrupted application onto a flat, in particular fibrous, substrate takes place.

In this context, it is advantageous that the application is realized only a few minutes (in particular 0-5 minutes) after mixing in order to keep separation of the components as minimal as possible.

In one embodiment, the application is carried out by means of applicator nozzles which are in particular connected with a gear pump.

In one embodiment, the application is realized by means of a wide slot nozzle which is located within a steel pipe with many bores (size and number dependent on the desired adhesive dot pattern) and application is through the steel pipe. With the size of the pipe and the size of the bores, in combination with the conveyed quantity of adhesive, the dot size or the length of the hot melt application is determined.

In one embodiment, the method serves for producing a filter body according to the invention with channels that are alternatingly closed off. A flat layer and a corrugated layer of a web-shaped filter material are placed on each other for forming a semi-finished product. In this connection, an uninterrupted sealing bead of liquid hot melt, in particular as used for the present invention, is metered between flat layer and corrugated layer onto the flat layer along a terminal edge of the flat layer by means of a nozzle. When placing flat layer and corrugated layer onto each other, subsequently by means of the sealing bead closure plugs are formed which close off fluid-tightly at one end the channels formed between flat layer and corrugated layer. Alternatively, application to the corrugated layer is possible also. As an option, additionally a flat adhesion bead of hot melt is applied which does not close off channels but generates an adhesive connection between flat layer and corrugated layer. The thus formed semi-finished product is subsequently provided along the second terminal edge which is opposite the first one with a further sealing bead and subsequently is wound, in particular about a core, wherein again channels are formed which are closed off by closure plugs. Flow through the channels along the winding axis is thus possible only in that fluid, entering a channel that is closed off at the end by a closure plug, passes through the filter medium layer (flat or corrugated layer) into a channel which is closed off at the inflow, whereby the fluid is purified.

An alternative possibility for forming a filter element allowing flow therethrough from the aforementioned semi-finished product resides in that several stacked layers of the semi-finished product are glued together.

The filter elements according to the invention are provided with a seal, preferably at a surface through which flow passes, for separating raw side and clean side in a filter housing.

In a further embodiment of a method for producing a filter element according to the invention, a web of flat filter medium is preferably provided with nominal fold edges, for example, by pressing transversely to the web direction and advancing direction or by fusing along the nominal fold edges of single-layer or multi-layer synthetic media, for example, nonwovens and/or fabrics and/or mesh materials, for example, of thermoplastic fibers, in particular of meltblown fibers. Along the terminal edges of the web, uninterrupted hot melt beads (sealing beads) in particular of hot melt according to this invention are applied. In a second step, the folds are erected so that the sealing beads between two fold edges come into sealing contact across the fold height and close seal-tightly the end faces in such a way that the raw side is separated from the clean side.

In an advantageous embodiment, this state, when the folds are erected, a further adhesive bead (distance bead) is applied onto at least one of the planes which are defined by the fold edges; it is applied onto the fold edges uninterrupted across several fold edges, in particular perpendicular to the fold edges, in particular in order to stabilize the filter bellows and to keep constant the spacing between the neighboring fold edges in operation. This distance bead preferably does not closes off the folds in same way as the sealing beads but extends substantially (corrugation formation is unavoidable) in the plane which is defined by the fold edges. This distance bead can be additionally provided as a fastening means for a preseparating stage, in particular a flat preseparating nonwoven which is arranged flat at the inflow side, when it is applied as long as the distance bead is still liquid or at least can still produce adhesive connections. Additionally or alternatively, parallel in the same plane further adhesive beads (preseparator nonwoven fastening beads) can be applied, in particular along and in the area of the end faces, for example, at a spacing not more than 10 cm, preferably 5 cm, away from the sealing beads relative to the center for connecting the pre-separator nonwoven that is to be subsequently applied.

In one embodiment of the filter element produced according to the invention with a pre-separator nonwoven, the raw side is surrounded completely by a seal which serves for seal-tight installation in a filter housing.

In a further embodiment of a method for producing a filter element according to the invention, in particular a lateral band of two sections connected by means of the wide adhesive bead applied preferably by means of a wide slot nozzle, preferably of the hot melt system which is used according to the invention, is connected with filter bellows which is in particular flat. The adhesive bead in the area of the overlap of the sections is in particular uninterrupted. The use of this hot melt has the advantage that significantly fewer hot melt strings are produced upon closing of the applicator nozzles.

In one embodiment, two lateral bands are used laterally, perpendicularly to the fold edges, in order to form a completed filter element of a folded filter medium web. The lateral bands are in particular made of textile material, plastic fabric, plastic mesh, in particular expanded mesh, or of nonwoven, in particular of thermoplastic fibers, in particular meltblown fibers. Onto the lateral bands, a flat uninterrupted hot melt bead (sealing bead) of the hot melt material according to the invention is applied so as to extend substantially at least across the fold height, in particular by means of a wide slot nozzle. The width of the hot melt bead is maximally as wide as the lateral band and does not project past its edges. The lateral band is pressed with the still liquid hot melt against the terminal edges of the web of filter medium wherein the sealing bead laterally closes off the erected folds with formation of a fold pocket such that raw side and clean side of the filter element are seal-tightly separated from each other. In this context, lateral surfaces of the lateral band can serve as sealing surfaces in a filter housing, in particular of a cabin air filter system, in particular for the filtration of cabin air of road vehicles, agricultural machinery or construction machinery. In addition, in a similar way a further seal-tight lateral band can be provided transversely to the first lateral bands along the fold edges, also connected at the end of the web with an uninterrupted hot melt bead (sealing bead) of the hot melt material employed in accordance with the invention which extends substantially at least across the fold height.

The invention concerns moreover the use of a hot melt system for a string-free gluing of flat substrates, in particular filter media, for example, cellulose media, meltblown filter media, nanofiber media or combinations thereof, in particular by means of regularly or irregularly interrupted hot melt beads.

In one embodiment, gluing of the filter element is done with an adhesive hot melt system, the hot melt system comprising a hot melt mixture, the mixture comprising 15-85% by weight, in particular 30-70% by weight, of a first hot melt that is polyester-based, and 15-85% by weight, in particular 30-70% by weight, of a second hot melt that is polyamide-based. In this context, the sum of the components should constitute 100% of the hot melt mixture and in particular 100% of the hot melt system.

In one embodiment, the use of a hot melt of a hot melt system is done for gluing filter elements by means of hot melt beads, wherein the hot melt system comprises a hot melt mixture, the hot melt mixture comprised of 15-85% by weight, in particular 30-70% by weight, of a first hot melt that is polyester-based, and 15-85% by weight, in particular 30-70% by weight, of a second hot melt that is polyamide-based, wherein the weight proportions of the first and the second hot melt together result in 100% by weight of the hot melt mixture, wherein the hot melt mixture constitutes a proportion of more than 75% by weight, in particular more than 85% by weight, particularly preferred more than 95% by weight, of the hot melt system, wherein the remainder is comprised of fillers, such as chalk, and/or pigments, such as titanium dioxide as a white pigment, and/or a tackiness-imparting resin and/or at least one further hot melt that is based on polycondensate.

This hot melt system has surprisingly the advantage that with it an in particular regularly interrupted bead-shaped application of the hot melt, in particular by means of applicator nozzles, onto a substrate without, or substantially without, formation of hot melt strings is possible.

The quantities of the first and the second hot melt are to be understood such that the first as well as the second hot melt each can be comprised of several polyester-based or polyamide-based hot melts, in particular in order to be able to perform a fine adjustment of material parameters and mechanical properties.

In one embodiment, the hot melt mixture has a proportion of more than 75% by weight, preferably more than 85% by weight, particularly preferred more than 95% by weight, in particular 100% by weight, of the hot melt system, wherein the remainder is comprised of fillers, such as chalk, and/or pigments, such as titanium dioxide as a white pigment, and/or a tackiness-imparting resin (aromatic, aliphatic, or cycloaliphatic hydrocarbon resins or modified or hydrogenated versions thereof, for example, pine resin (esters) or aliphatic or alicyclic petroleum hydrocarbon resins or their hydrogenated derivatives, as, for example, disclosed in WO 2007/057059 A1) and/or paraffin and/or a further hot melt that is based on polycondensate.

In one embodiment, the hot melt system contains between 0-25% by weight additives or fillers which may be selected from the additives and fillers of the basic hot melts, i.e., of the first polyester-based hot melt and the second polyamide-based hot melt, mentioned in the following.

In one embodiment, the polyester-based hot melt contains as an additive a carbodiimide, calcium oxide or an anhydride, in particular for improving the hydrolysis resistance and/or the adhesive properties, in particular in a weight proportion of 0-5%.

In one embodiment, the polyester-based hot melt contains as an additive a wax, in particular paraffin and/or an oxide wax or an additive in powder form, in particular pyrogenic silica, in particular for accelerating the crystallization, in particular in a weight proportion of 0-5%.

In one embodiment, the polyester-based hot melt has a density between 1.15 and 1.35 g/cm$^3$, preferably 1.2-1.3 g/cm$^3$, particularly preferred 1.23-1.27 g/cm$^3$.

In one embodiment, the polyamide-based hot melt has a density between 0.95 and 1 g/cm$^3$ s, preferably 0.97-0.99 g/cm$^3$.

In one embodiment, the polyester-based hot melt has an elongation at break of >50%, preferably >70%, particularly preferred >90%, in particular measured according to ISO 527.

In one embodiment, the polyester-based hot melt has a melting temperature between 150° C. and 170° C., preferably between 150° C. and 160° C.

In one embodiment, the polyamide-based hot melt has a melting temperature between 180° C. and 210° C.

In one embodiment, the polyamide-based hot melt has a softening temperature of less than 188° C., preferably less than 175° C., particularly preferred less than 165° C.

In one embodiment, the polyamide-based hot melt has a processing temperature between 180° C. and 230° C.

In one embodiment, the polyester-based hot melt is formed of a composition of basic materials, the composition comprising:
e. At least one acid, in particular phthalic acid or isophthalic acid or terephthalic acid or adipic acid or butanedioic acid or 6-hydroxy hexanoic acid or a mixture of at least two of these acids, in particular for reducing crystallinity,
f. and at least one diol, in particular 1,2-ethanediol or 1,4-butanediol or neopentyl glycol or 1,6-hexanediol or cyclohexane dimethanol or diethylene glycol or a mixture of at least two of these diols, in particular for reducing crystallinity,
in particular formed by polycondensation.

In one embodiment, the polyester-based hot melt is formed of a composition of basic materials, the composition comprising 30-50% by weight, preferably 30-45% by weight, particularly preferred 30-40% by weight, butanediol or ethanediol or a mixture thereof.

In one embodiment, the polyester-based hot melt is formed of a composition of basic materials, the composition comprising >20% by weight, preferably >30% by weight, terephthalic acid, in particular for reducing the stringing tendency and/or increasing the melting point.

In one embodiment, the polyester-based hot melt is formed of a composition of basic materials, the composition comprising <65% by weight, preferably <45% by weight, particularly preferred <35% by weight, terephthalic acid, in particular for reducing the stringing tendency In one embodiment, the polyester-based hot melt is formed of a composition of basic materials, the composition comprising >10% by weight, preferably >20% by weight, particularly preferred >25% by weight, adipic acid, in particular for reducing the melting point and/or the stringing tendency.

In one embodiment, the polyester-based hot melt is formed of a composition of basic materials, the composition comprising <40% by weight, preferably <30% by weight, adipic acid, in particular for reducing the melting point and/or the stringing tendency.

In one embodiment, the polyamide-based hot melt is formed of a composition of basic materials, the composition comprising <30% by weight, preferably <25% by weight, sebacic acid, in particular for improving the heat resistance and/or for reducing the stringing tendency.

In one embodiment, the polyamide-based hot melt is formed of a composition of basic materials, the composition comprising:
g. at least one acid, in particular adipic acid or azelaic acid or sebacic acid or dimer fatty acid or a mixture of at least two of these acids,
h. and at least one amine, in particular ethylene diamine or hexamethylene diamine or 2,2,4-trimethylhexamethylene diamine or ε-caprolactam or 1-amino-3-aminomethyl-3,5,5-trimethylcyclohexane (isophorone diamine) or piperazine or a mixture of at least two of these amines,
in particular formed by polycondensation.

In one embodiment, the polyamide-based hot melt is formed of a composition of basic materials, the composition comprising 50-90% by weight, preferably 60-80% by weight, particularly preferred 60-70% by weight, ε-caprolactam or hexamethylene diamine or 2,2,4-trimethylhexamethylene diamine or a mixture of at least two of these amines.

In one embodiment, the polyamide-based hot melt is formed of a composition of basic materials, the composition comprising >5% by weight, preferably >10% by weight, particularly preferred >15% by weight, of adipic acid, in particular for improving the heat resistance and/or for reducing the stringing tendency and/or for increasing elongation at break.

In one embodiment, the polyamide-based hot melt is formed of a composition of basic materials, the composition comprising <30% by weight, preferably <25% by weight, adipic acid, in particular for improving the heat resistance and/or for reducing the stringing tendency In one embodiment, the total proportion of adipic acid in the basic materials of the polyamide-based hot melt and of the polyester-based hot melt is >5% by weight, preferably >10% by weight, particularly preferred >15% by weight, and at the same time <35% by weight, preferably <30% by weight, and in particular preferred <25% by weight, in particular for improving the heat resistance and/or for reducing the stringing tendency.

In one embodiment, the hot melt comprises a hot melt mixture, the mixture comprising:
i. Between 30 and 70% by weight, preferably 45-55% by weight, of a first polyester-based hot melt,
j. Between 30 and 70% by weight, preferably 45-55% by weight of a second polyamide-based hot melt.

BRIEF DESCRIPTION OF THE DRAWINGS

Further advantages, features, and details of the invention result from the following description in which embodiments of the invention will be explained in more detail with the aid of the figures. A person of skill in the art will expediently consider the features disclosed in combination in the drawing, the description, and the claims also individually and combine them to other meaningful further combinations.

FIGS. 14A-14C illustrate a method according to the invention for producing a filter element, wherein FIG. 14A shows a flat filter medium web provided with nominal fold edges and applied sealing beads at the terminal edges; FIG. 14B illustrates that the folds are erected so that the sealing beads between two fold edges close the end faces; FIG. 14C shows a preseparator nonwoven and a seal applied to the folded product of FIG. 14B.

DESCRIPTION OF PREFERRED EMBODIMENTS

Figure 1:
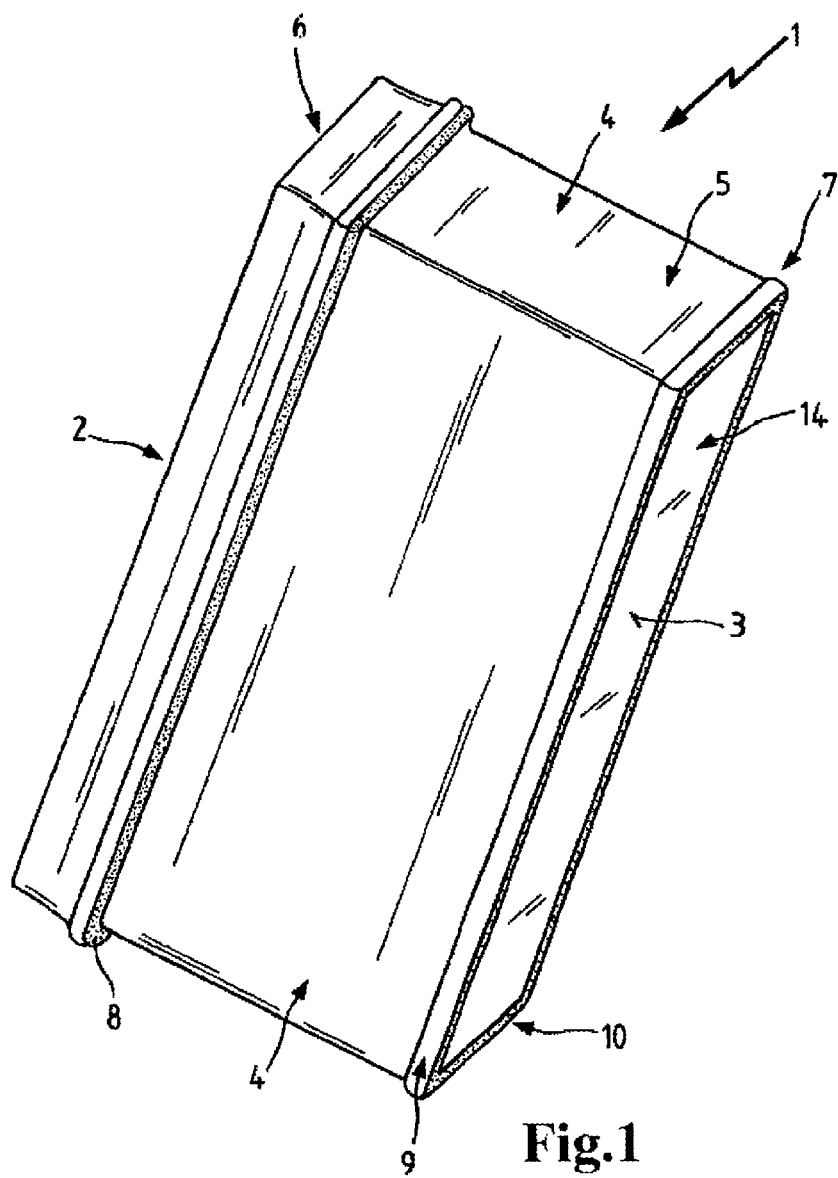
FIG. 1 shows a view of an embodiment of a filter according to the invention.

FIG. 1 shows a filter element 1 with a raw-side inflow side 2 and a clean-side outflow side 3. The filter element is formed by a filter medium 14 that is folded multiple times, wherein the folds extend between the inflow side and the outflow side, i.e., fold tips are positioned at the inflow side and at the outflow side, respectively. The lateral surfaces of the filter element 4 through which no flow passes are in particular surrounded by a polyester nonwoven which is provided with a hot melt layer, in particular formed by a hot melt according to the invention, on the side which is facing the filter element. This hot melt layer produces an areal adhesive connection of the polyester nonwoven with the filter element, wherein also the end face 5 of the filter bellows is sealed. The filter element 1 comprises a main frame 6 and an auxiliary frame 7, wherein the main frame has an axial seal 8 which seals in the direction of the outflow side 3 and is inserted into a groove of the main frame or into a groove between main frame and lateral surfaces 4. The auxiliary frame is connected by an adhesive connection with the lateral surfaces 4 and has radial surfaces 9 and axial surfaces 10 for supporting the filter element in a housing, not illustrated.

Figure 2:
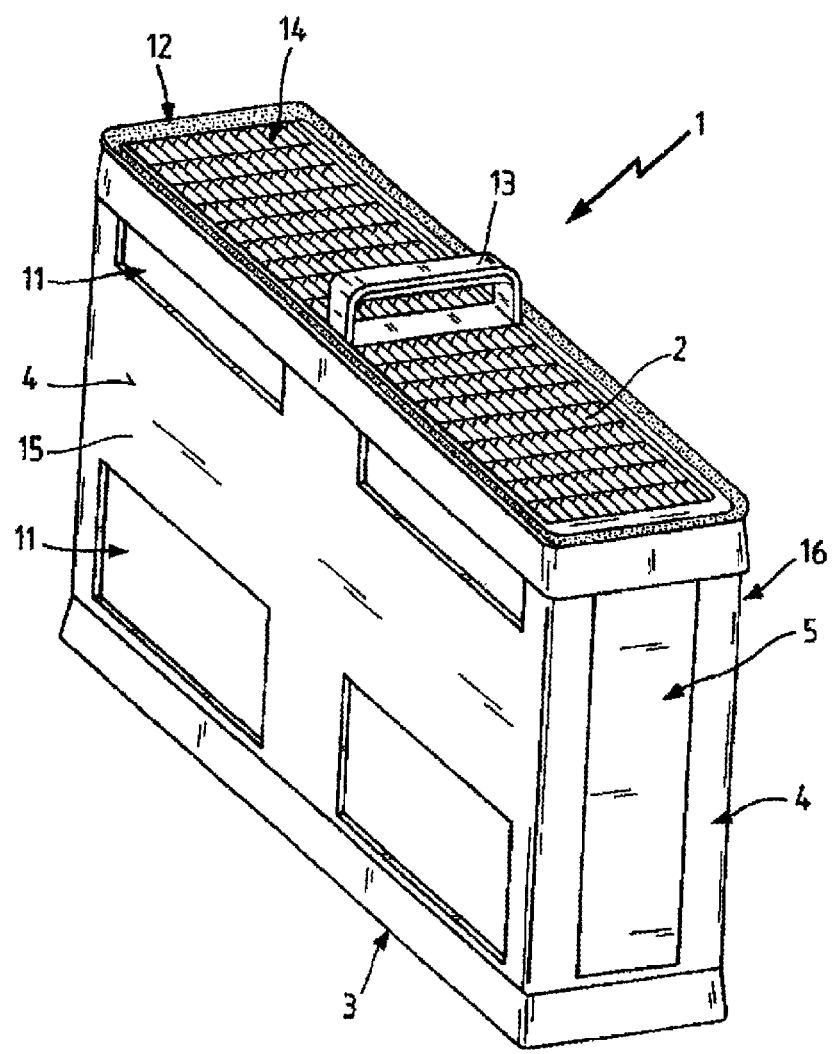
FIG. 2 is a view of a further embodiment of a filter according to the invention.

FIG. 2 shows an embodiment of a filter element 1 with a raw-side inflow side 2 and a clean-side outflow side 3. At the lateral surfaces 4 of the filter medium 14 through which no flow passes, a plastic frame 16 is attached by means of a hot melt connection which is formed in particular by the hot melt according to the invention, wherein on the end faces 5 by means of the hot melt also sealing of the end face is realized. At the terminal sides 15 openings are introduced into the plastic frame 16. The plastic frame 16 supports at the inflow side 2 an axial seal 12 which can be brought into engagement with the sealing surface of the housing, not illustrated. Moreover, a grip 13 is provided which is connected with the plastic frame 16 and which serves for better handling of the filter element 1.

Figure 3:
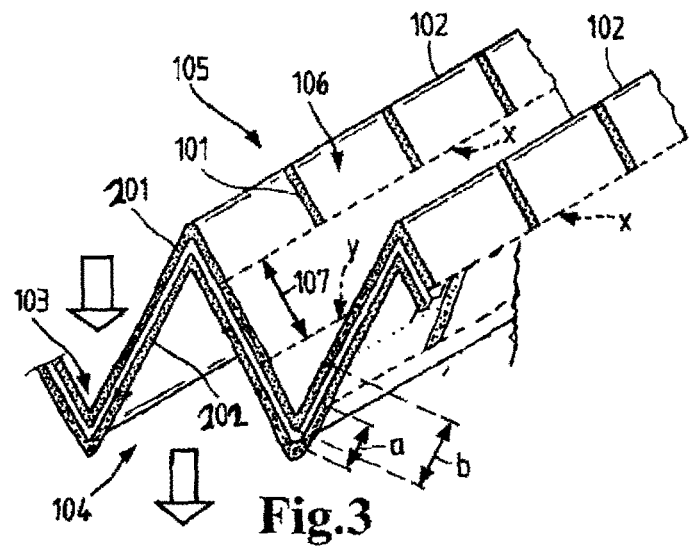
FIG. 3 is a detail view of an arrangement of the adhesive beads on a filter according to the invention.

FIG. 3 shows the detail view of an arrangement of different adhesive beads on a filter element according to the invention. In this embodiment, the folds are provided with stabilizing beads 101, in particular of the hot melt according to the invention, which extends between the fold tips 102 and the fold bottom 103. In this context, stabilizing beads 101 are introduced on the clean side 104 as well as on the raw side 105. In this context, before erecting the individual folds, at least two, in particular continuous, stabilization beads 101 are applied parallel to each other and perpendicular to the direction of the fold edges 102, 103 onto the filter medium 106. The stabilization beads 101 which are otherwise in particular continuous are in particular interrupted at regular spacings by an interruption 107. At the raw side 105, the adhesive bead is interrupted once between the fold tip and fold bottom. The interruption 107 is located in this context centrally between fold tip and fold bottom and corresponds in its length to between one third and one half of the fold height. The interruption 107 begins at a spacing b from the raw-side fold bottom 103. Accordingly, at the raw side the folds are glued only in the area of the fold bottom and of the fold tips. At the clean side, an interruption of the adhesive bead across a length a is provided which surrounds the clean-side fold tip. Accordingly, the folds at the clean side are not glued in the area of the fold tips.

The spacings a and b from the raw-side fold bottom and the clean-side fold tip are designed such that the interruptions 107 of the clean-side and of the raw-side adhesive bead do not overlap each other. In this way, it is ensured that in the area of the clean-side fold tips as well as in the vicinity of the clean-side fold bottom an overlap of the clean-side 104 and raw-side 105 adhesive bead 101 is formed.

The straight lines x and y which are formed by the start and end points of the individual adhesive bead sections extend parallel to the fold edges. Moreover, at the raw side, sealing beads 201 that are uninterrupted at the end face and, at the clean side, optionally uninterrupted sealing beads 202 are provided which, when erecting the folds, close off laterally the erected folds with formation of a fold pocket such that raw side and clean side of the filter element are seal-tightly separated from each other. In this context, the clean-side sealing beads 202 are not necessarily required with respect to the separation of raw side and clean side but are advantageous with regard to stability of the filter element.

Figure 4:
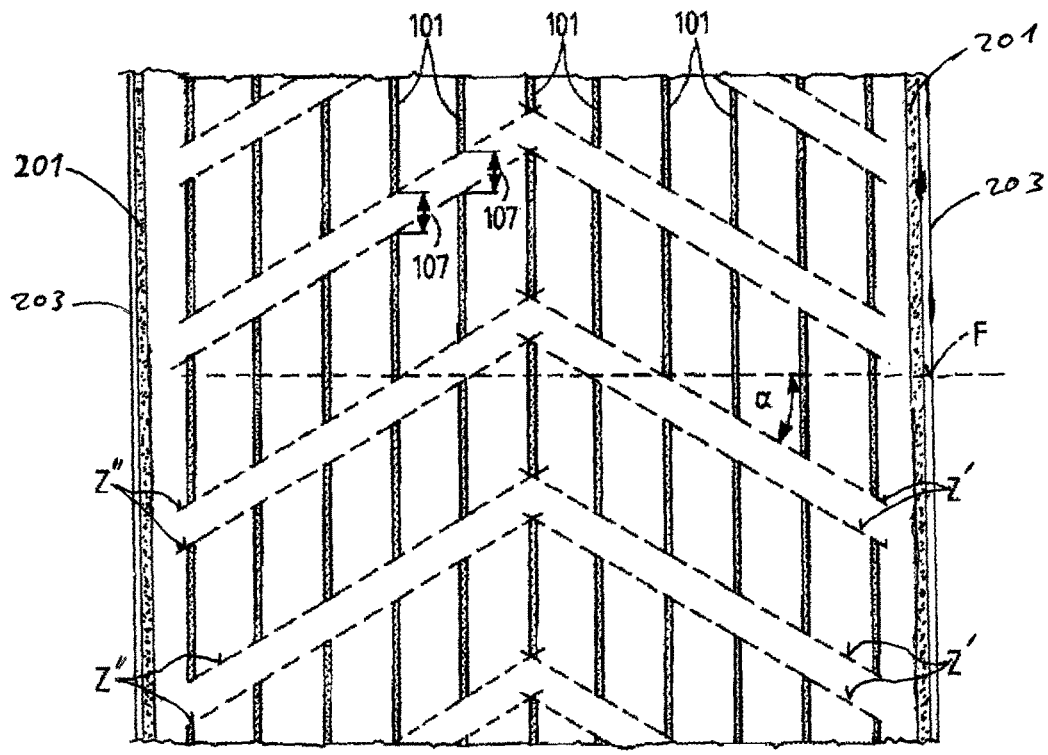
FIG. 4 is a detail view of an alternative arrangement of the adhesive beads on a filter according to the invention.

FIG. 4 shows an alternative arrangement of the adhesive beads that are formed in particular with the hot melt according to the invention on a filter element according to the invention, wherein the illustration shows the filter medium web in its flat unfolded state. In this embodiment, the start and end points of the interruptions of the stabilizing beads 101 are aligned along a plurality of straight lines z which extend parallel to each other and form with the fold edges F an angle α of 10-80°, preferably 45+/−15°. In this context, the start and end points of the interruptions of the stabilizing beads extend along at least two sets of straight lines z' and z" wherein each set of straight lines comprises parallel straight lines, wherein the corresponding straight lines on the filter medium intersect each other so that an arrow-shaped or zigzag-shaped course of the interruptions 107 of the stabilizing bead 101 on the filter medium is formed. Raw-side sealing beads 201 extend along the terminal edges 203 of the filter medium in such a way that the sealing beads, when erecting the folds, laterally close them off with formation of a fold pocket such that the raw side and the clean side of the filter element are seal-tightly separated from each other.

Figure 5:
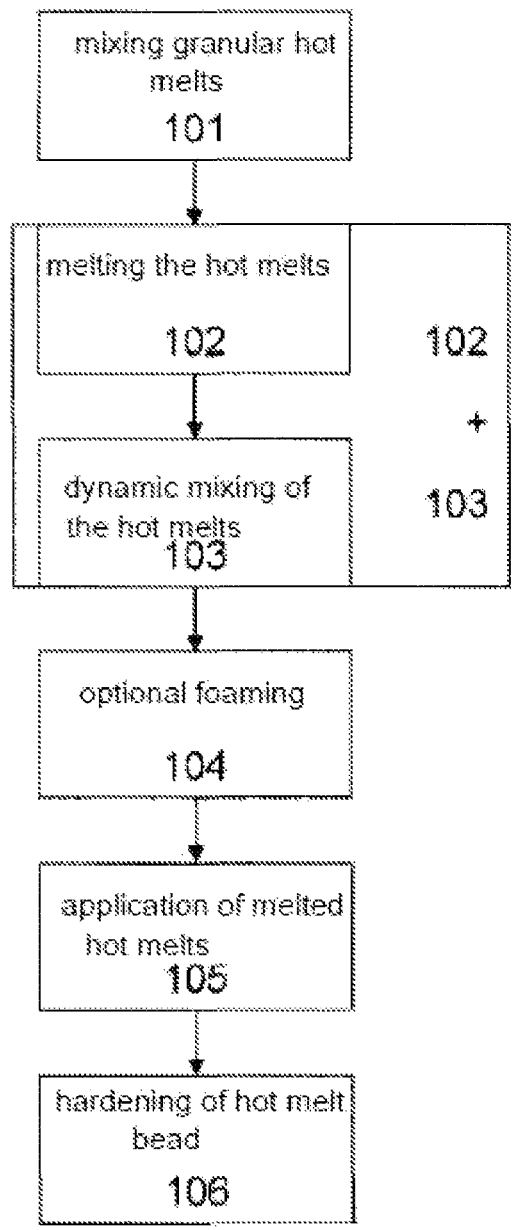
FIG. 5 shows a sequence of method steps according to the invention for producing a filter element.

In FIG. 5 an embodiment of the sequence of the method according to the invention for producing a filter element with the hot melt system is illustrated.

The method for producing the filter element according to the invention comprises in this embodiment the steps of:
(101) mixing the granular materials of the two hot melts before heating,
(102) melting the first hot melt that is polyester-based and the second hot melt that is polyamide-based, in particular in a composition according to the invention and in quantities according to the invention, for example, in a tank melter,
(103) in particular dynamically mixing the two hot melts, in particular with generation of shearing forces in the melt, to a hot melt mixture, for example, with an agitator or a conveying device with conveying worm or gears, wherein the steps 102 and 103 are however preferably simultaneously carried out as steps (102+103) in an extruder,
(104) optional foaming of the melted hot melt system with a gas, in particular nitrogen, air, $CO_2$ or the like,
(105) application of the melted hot melt mixture onto a web-shaped filter medium in at least one adhesive bead, in particular by means of an applicator nozzle, in particular in at least one, in particular regularly or irregularly interrupted, adhesive bead, in particular without intermediate cooling, in particular only 0-5 minutes after mixing,
(106) hardening of the at least one adhesive bead with bonding of sections of a filter medium web of the filter medium with other sections of the same filter medium web or with sections of a second, in particular corrugated, filter medium web and/or with a preseparator nonwoven.

Hardening of the hot melt bead applied before erecting the folds can be carried out in particular after erecting the folds of the fold bellows such that during hardening the folds are glued together by the applied hot melt mixture.

Figure 6:
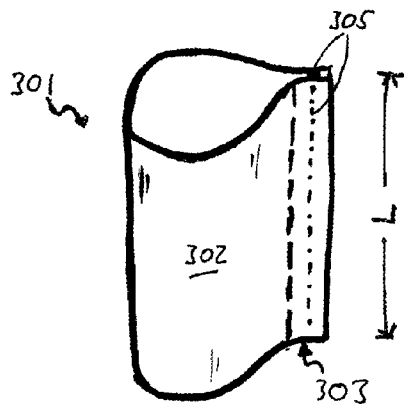
FIG. 6 shows in a perspective view an annular filter bellows of a flat filter medium sheet formed to a tubular body with end sections glued together by an adhesive bead.

FIG. 6 shows an embodiment for an annular filter bellows. In this context, the filter bellows 301 is formed of a web of a flat filter medium, such as, for example, of a nonwoven filter material. First, rectangular filter material sheets are formed such that the end sections of the sheet 303 are snuggly resting on each other. In FIG. 6 an endless filter bellows 302 results accordingly, wherein the end sections 303 are secured by a sealing bead 305 of the hot melt which extends between the end sections 303 of the sheet. The sealing bead 305 is illustrated here in dash-dotted line. The filter bellows 301 can be inserted, for example, into a filter cup in a filter device so that the fluid to be filtered, for example, fuel, oil or even air, can pass through the filter medium and is thereby purified.

In this context, the sealing bead 305 connects across the entire length L, or in the illustration of FIG. 6, across the entire height, the respective end sections connected with each other in a fluid-tight manner.

Figure 7:
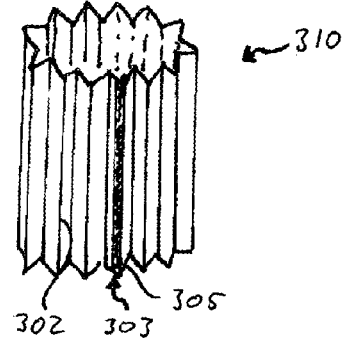
FIG. 7 shows in a perspective view an annular filter bellows of a zigzag-folded filter medium sheet formed to a tubular body with end sections glued together by an adhesive bead.

FIG. 7 shows in a perspective illustration a further embodiment wherein an annular filter bellows 310 for a filter element is formed of a zigzag-shaped folded filter medium. The zigzag-shaped filter material is formed to a bellows 302 in that end sections or terminal fold sections 303 are connected to each other by a sealing bead 305. Due to the zigzag-shaped folding a greater surface area of the material in the filter bellows 310 is provided. The connection of the end sections 303 of the flat filter material is illustrated in the following figures in more detail.

Figure 8:
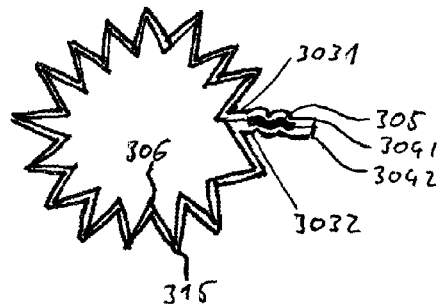
FIG. 8 shows an end view of the filter bellows according to FIG. 7.

In FIG. 8, a cross-section of the embodiment illustrated in FIG. 7 for a filter bellows for a filter element is illustrated. In an illustration of FIG. 8 one is looking onto the fold profile in the orientation of FIG. 7 from above or downward onto the fold bellows. Accordingly, folds 306 and 315 with opposite orientation result. The two terminal fold sections 3031, 3032 are connected to each other and sealed by the sealing bead 305. From the interior of the fold bellows, no fluid can escape by means of the end sections 3031, 3032 connected to each other. The end sections 3031, 3032 that are connected to each other are pressed together while the sealing bead of hot melt is still liquid, preferably until the hot melt hardens. Pressure application is realized preferably by means of profiled profiles or tongs which have, for example, a corrugated or zigzag profiling extending parallel to the terminal fold sections. In this way, as illustrated in the figure, correspondingly shaped end sections 3031, 3032 are produced and a more durable connection is produced. The zigzag-shaped filter material sheet is bent in such a way that the two terminal fold sections 3031, 3032 are resting flat on each other. In this context, the end edges 3041, 3042 form a common terminating edge.

Figure 9:
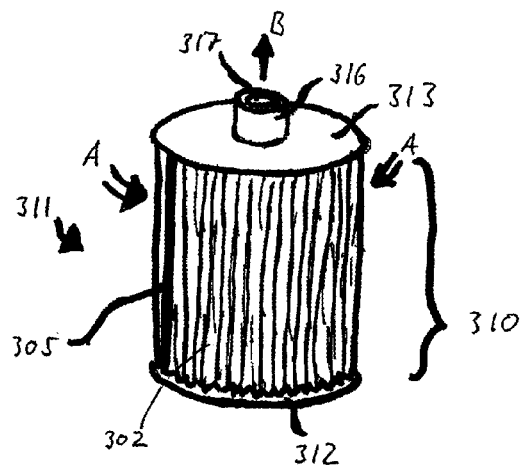
FIG. 9 shows a filter element with a filter bellows of FIG. 7.

FIG. 9 shows a filter element 311, for example, as an oil or fuel filter which is embodied with a filter element 310 as described above. The filter element or fuel filter 311 comprises a fold bellows 302, 310 formed of a zigzag-shaped filter material that is secured between two covers 312, 313. The fold bellows correspond to a filter element 310 in which two end sections are connected to each other fluid-tightly by the sealing bead 305.

The upper cover 313 is provided with a connector 316 that has an opening 317. Fluid to be filtered can enter, for example, in direction of arrow A into the interior of the fold bellows 310, flow through the folds of the filter material, and exit the filter element 311 through opening 317 in the direction of arrow B. Alternatively, a flow in opposite direction is conceivable. Of course, other filter devices are conceivable. For example, the filter element can be inserted into a filter cup or an angular bellows can be formed. The covers 312, 313 are also referred to as end disks. The sealing bead 305 is in seal-tight connection with the covers 312, 313, respectively, so that a reliable sealing action between raw side and clean side is realized. In case of a fused-on cover, a polyurethane cover or a cover of a material which under heat action swells and hardens, the ends of the sealing bead 305 are embedded in the cover; in case of a cover which is glued to the filter bellows 302, 320, the ends of the sealing bead 305 are embedded in the adhesive layer between cover and filter bellows or connected therewith.

Figure 10:
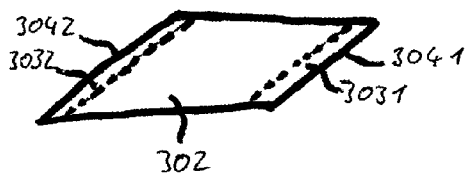
FIG. 10 shows a flat filter medium sheet indicating the end sections to be attached to each other to form a tubular body.
Figure 11:
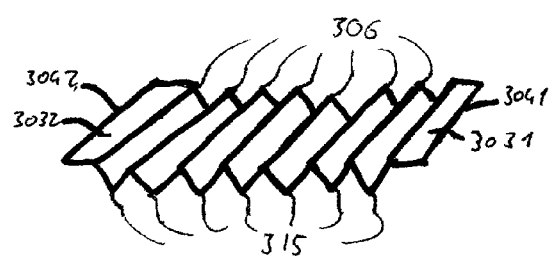
FIG. 11 shows a zigzag-folded filter medium sheet indicating the end sections to be attached to each other to form a tubular body.

The illustrations of FIGS. 10, 11 serve for explaining variants of the manufacturing method for corresponding filter elements. In a first step, as illustrated in FIG. 10, a flat filter material sheet 302 is provided. The filter material sheet 302 is, for example, of a rectangular shape. Accordingly, the oppositely positioned end sections 3031, 3032 are to be connected with each other so that a tubular filter element body is formed. Consequently, in particular the end edges 3041, 3042 are placed on each other in this context. In order to form a zigzag-shaped fold bellows, as illustrated in FIGS. 7-9, the filter material sheet is first pleated or folded. This is illustrated in FIG. 11. Various methods for zigzag-shaped folding of filter materials are known. For example, oppositely engaging folding knives can be used which produce folds of different orientation 306, 315 in the filter sheet. Also, rotating knife arrangements are known.

In FIG. 11, one can see a folded filter material sheet wherein the end sections 3031, 3032 now correspond to terminal fold sections 3031, 3032.

Figure 12:
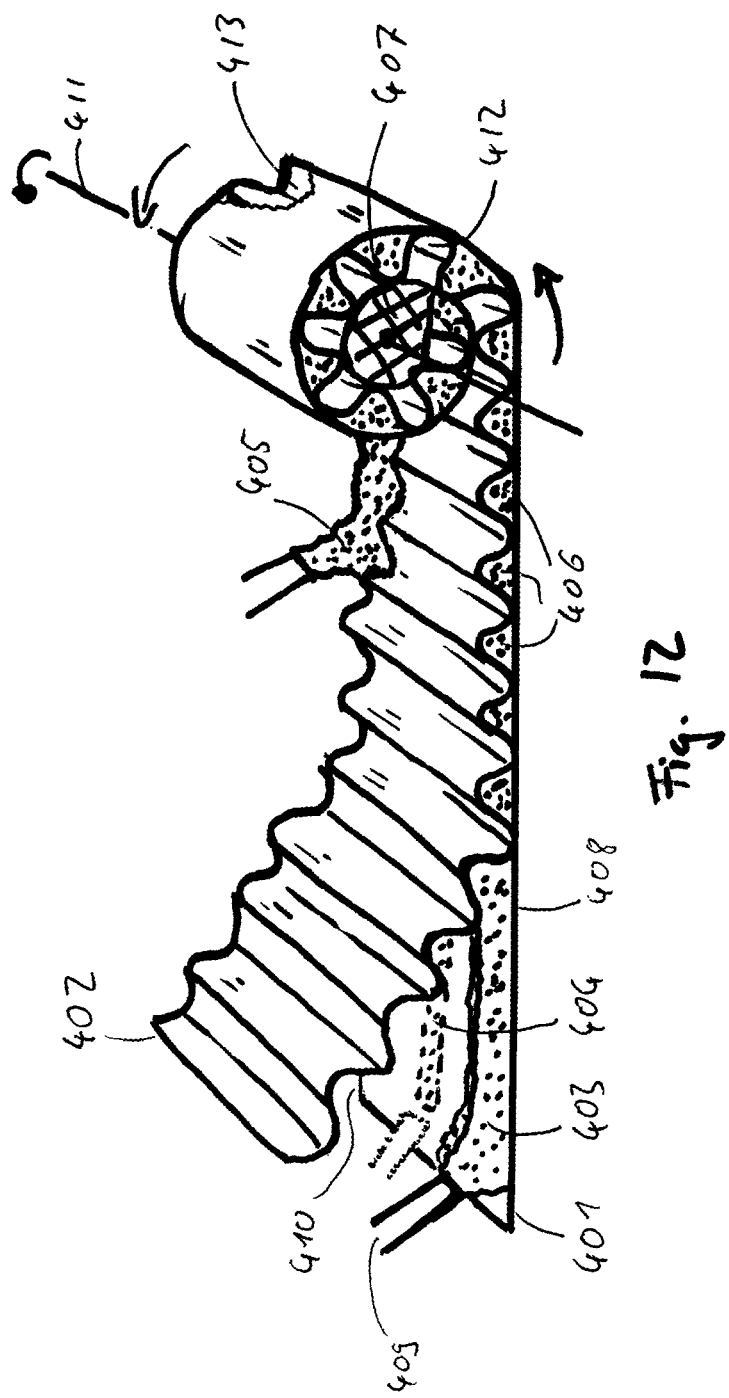
FIG. 12 illustrates a method for producing a filter body with alternatingly closed channels.

In FIG. 12, a method for producing a filter body according to the invention with alternatingly closed channels illustrated. A flat layer 401 and a corrugated layer 402 of a web-shaped filter material are placed on top of each other for forming a semi-finished product. In this context, an uninterrupted sealing bead 403 of liquid hot melt is applied between flat layer 401 and corrugated layer 402 onto the flat layer along a terminal edge 408 of the flat layer 401 by means of a nozzle 409. When placing flat layer and corrugated layer onto each other, by means of the sealing bead 403 closure plugs 406 are formed subsequently which close off fluid-tightly the channels formed between the flat layer and the corrugated layer at one end. As an option, additionally a flat adhesion bead 404 of hot melt is applied which does not close off channels but produces an adhesive connection between flat layer 401 and corrugated layer 402. The thus formed semi-finished product is subsequently provided along the second terminal edge 410 positioned opposite to the first one with a further sealing bead 405 and subsequently wound to a coil in particular onto a core 407 whereby also channels are produced which are closed off by closure plugs. Flow through the channels along the winding axis 411 is thus possible only in that fluid entering a channel 412 that is terminally closed off by closure plug 406 passes through a filter medium layer (flat layer or corrugated layer) into a channel 413 which is closed off at the inflow side so that the fluid is purified.

Figure 13:
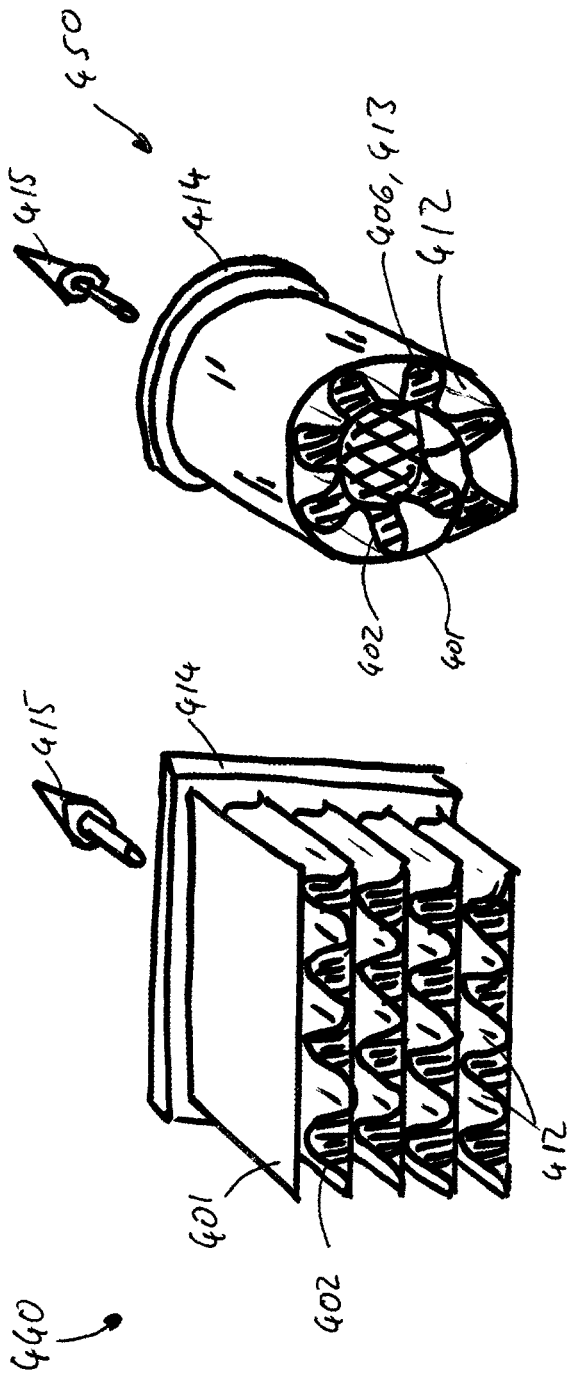
FIG. 13A shows a semi-finished product stacked and glued together and provided with a seal.
FIG. 13B shows a wound filter body produced according to FIG. 12 with seal.

An alternative possibility for forming a filter element allowing flow therethrough, for example, in the flow direction 415 from the aforementioned semi-finished product is illustrated in FIG. 13A in which the semi-finished product is section-wise glued in analogy to FIG. 12 on top of each other. At a surface that is flowed through, the filter element is provided with a seal 414 for separating raw side and clean side in a filter housing. In FIG. 13B the wound filter body is used instead which can be obtained in accordance with FIG. 12. In other respects, same features are identified with same reference characters.

Figure 14:
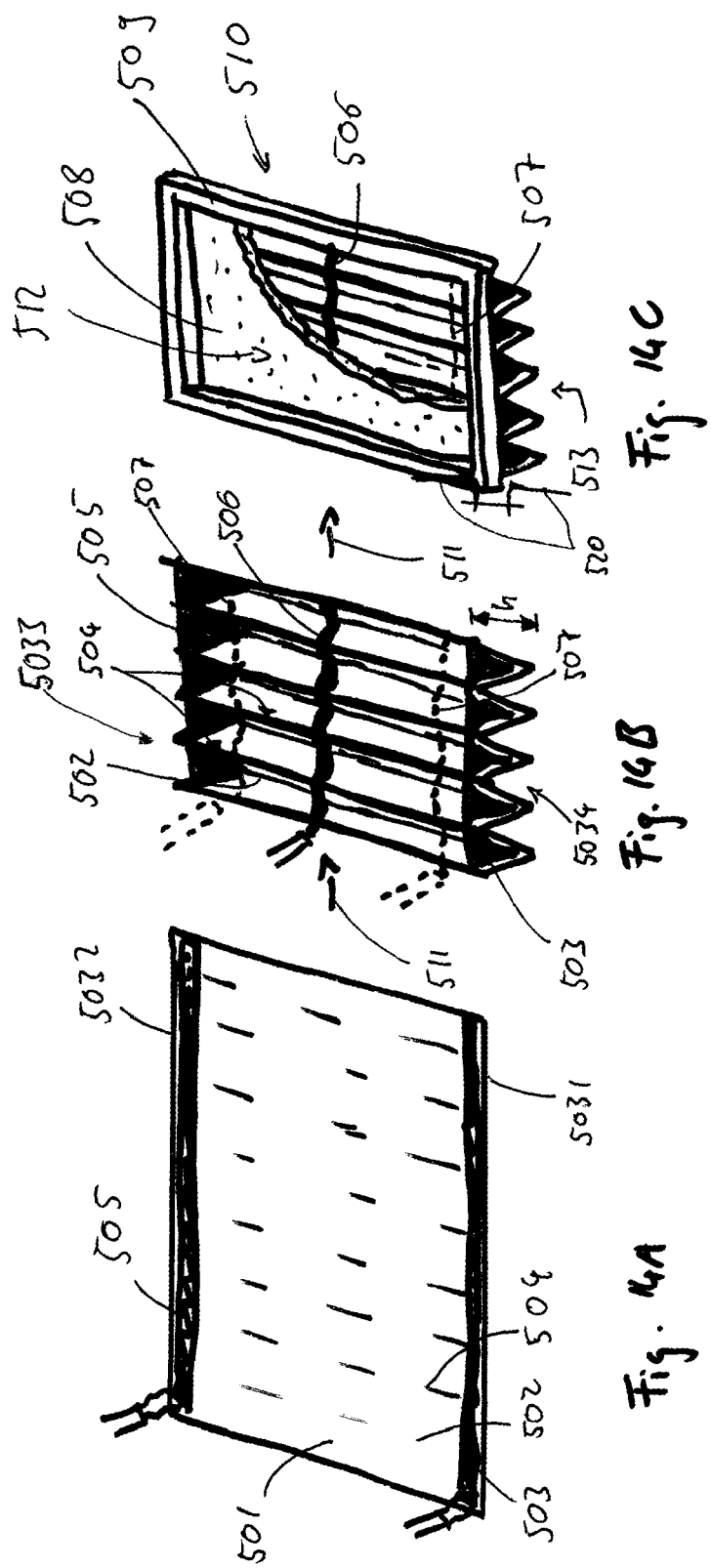

In FIG. 14 A-C, a method according to the invention for producing a filter element 510 according to the invention is illustrated. In case of filter media which require this, a web 501 of flat filter medium is preferably already provided, e.g. by rolling, with nominal fold edges 502, 504, e.g. by pressing transversely to the web and advancing direction 511 or by fusing along the nominal fold edges of single-layer or multi-layer synthetic media, e.g. nonwovens and/or fabrics and/or mesh materials, e.g. of thermoplastic fibers, in particular meltblown fibers. Along the terminal edges 5031, 5032 of the web 501 uninterrupted adhesive beads (sealing beads) of hot melt are applied. In a second step, the folds are erected, see FIG. 14B, so that the sealing beads between two fold edges 504 across the fold height h come into seal-tight contact and close seal-tightly the end faces 5033 and 5034 in such a way that the raw side 512 is separated from the clean side 513.

In this state, when the folds are erected, on at least one of the planes which are defined by the fold edges 502, 504, a further adhesive bead (distance bead) 506 is applied which is applied on the fold edges 504, 502 uninterrupted across several fold edges 504, 502, in particular perpendicularly to the fold edges, in particular in order to stabilize the filter bellows and to keep constant the spacing between the neighboring fold edges in operation. This distance bead 506 preferably does not close off the folds in the same way as the sealing beads 503, 505 but extends substantially (corrugation formation is unavoidable) in the plane that is defined by the fold edges 504, 502. This distance bead can additionally serve as a fastening means for a preseparating stage, in particular a flat preseparating nonwoven 508 that is arranged flat on the inflow side, when it is applied as long as the distance bead is still liquid or at least can still produce adhesive connections. Additionally or alternatively, in the same plane parallel to the distance bead, further adhesive beads (pre-nonwoven fastening beads 507) can be applied, in particular along and in the area of the end faces 5033 and 5034, for example, at a spacing not farther than 10 cm, preferably 5 cm, from the sealing beads relative to the center, for connecting the preseparator nonwoven 508 to be subsequently applied.

FIG. 14C shows a view of an in particular inventively produced filter element 510 with a preseparator nonwoven 508 at the raw side 512 which is surrounded by a seal 509 which serves for seal-tight installation in a schematically indicated two-dimensionally illustrated filter housing 520. The preseparator nonwoven 508 is illustrated with a cut-away part; in the cut-away part, sections of the distance bead 506 and of the pre-nonwoven fastening bead 507 can be seen. Of course, the flow can also be in opposite direction; in this case a preseparator nonwoven would have to be applied onto the side facing away from the seal 509.

Figure 15:
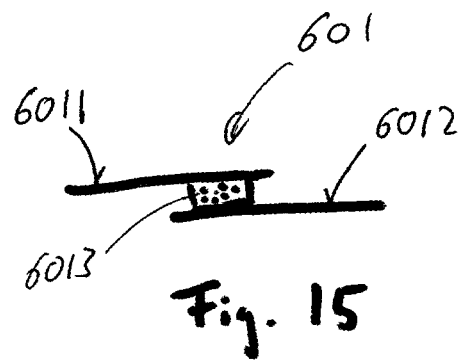
FIG. 15 shows a lateral band of two sections connected by means of a wide adhesive bead of the hot melt system according to the invention.

FIG. 15 shows a lateral band of two sections 6011, 6012, produced in particular according to an inventive method, the sections connected by means of a wide adhesive bead 6013 of the hot melt system used according to this invention applied preferably with a wide slot nozzle. The adhesive bead is in particular uninterrupted in the area of overlap. The use of this hot melt has the advantage that significantly fewer hot melt strings are produced when closing the applicator nozzles.

Figure 16:
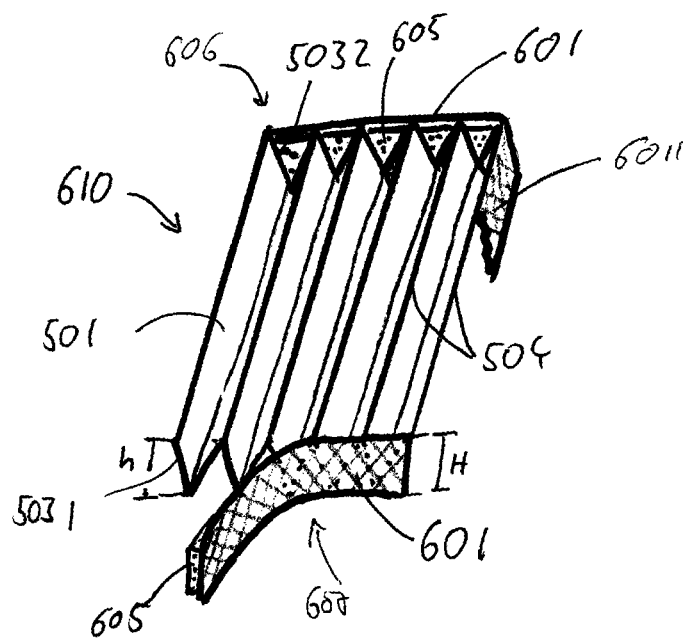
FIG. 16 shows a filter element made of a folded filter medium web and closed laterally by lateral bands.

FIG. 16 shows a filter element 610 which is made of a folded filter medium web and by means of two lateral bands 601 is closed laterally perpendicularly to the fold edges 504. The lateral bands are in particular joined from sections according to a method (see FIG. 15) described in the preceding paragraph. The lateral bands are in particular made of textile material, plastic fabric, plastic mesh, in particular expanded mesh, or of nonwoven, in particular of thermoplastic fibers, in particular meltblown fibers. Onto the lateral bands 601, a flat uninterrupted hot melt bead (sealing bead) 605 of hot melt used according to the invention is applied, respectively, in particular by means of a wide slot nozzle, so as to substantially extend across at least the fold height h. The width of the hot melt bead is maximally as wide as the lateral band 601 and does not project passed its edges. The lateral band with the still liquid hot melt is pressed against the end edges 5032, 5031 of the web 501 of filter medium so that the sealing bead 605 laterally closes off the erected folds with formation of a fold pocket in such a way that raw and clean sides 606, 607 of the filter element are separated seal-tightly from each other. In this context, lateral surfaces of the lateral band 601 can be sealing surfaces in a filter housing, in particular of a cabin air filter system, in particular for the filtration of cabin air of road vehicles, agricultural and construction machinery. In addition, in a similar way a further sealing lateral band 6011 can be provided transversely to the first lateral bands 601 along the fold edges, also attached at the end of the web 501 with an uninterrupted hot melt bead (sealing bead) 605, extending substantially at least across the fold height h and made of the hot melt used according to the invention.

The following examples describe hot melt systems which are used for a filter element according to the invention or used as a comparison.

Example 1

A polyester hot melt (Sika SikaMelt 9120) with a density of 1.25 g/cm³ and an elongation at break in the range of 75-115% and a polyamide hot melt (Henkel Marcomet 6208) with a density of 0.98 g/cm³ are each separately heated with mixing to processing temperature (200° C.). The stringing tendency is determined qualitatively such that a 1 mm thick round metal rod is immersed into the melt and is pulled out suddenly. In example 1, for both hot melts a hot melt drop remains on the round metal rod, on which, directly after pulling out from the melt, a hot melt string forms thereat that cools and hardens. A residual hardened string is detectable. The stringing tendency is therefore evaluated as high. Moreover, the granular material of the two aforementioned hot melts is mixed and the mixed granular material is heated to 200° and melted together. Immediately thereafter, in order to keep separation at minimum, an application by means of an applicator nozzle which is coupled directly with a gear pump is applied onto a flat filter medium. In doing so, surprisingly a minimal formation of strings is determined in comparison to using the two hot melts in separate form. Also, the stringing tendency of the hot melt mixture is qualitatively evaluated such that a 1 mm thick round metal rod is immersed into the melt which has been dynamically mixed again in a porcelain dish heated to processing temperature and is suddenly pulled out. A hot melt drop remains on the round metal rod into which the string, formed immediately after pulling out the round metal rod from the melt, retracts. No residual string can be detected. The stringing tendency is therefore evaluated as minimal.

Example 2

In same weight proportions, a polyester hot melt with a melting point of 150-160° C., substantially formed of 40% by weight butanediol, 33% by weight terephthalic acid, 27% by weight adipic acid, and a polyamide hot melt with a melting point of 130° C., formed of 67% by weight ε-caprolactam, 5% by weight 2,2,4-trimethylhexamethylene diamine, 12% by weight of 1-amino-3-aminomethyl-3,5,5-trimethyl cyclohexane, and 16% by weight adipic acid are mixed in granular form and together melted with dynamic mixing. The stringing tendency is determined qualitatively such that a round metal rod of 1 mm thickness is immersed into the melt and suddenly pulled out. In example 2, a hot melt drop remains on the round metal rod into which, directly after pulling out the round metal rod, the string formed of the melt retracts. A residual string cannot be seen. The stringing tendency is therefore evaluated as minimal.

Example 3

The polyester hot melt (Sika Sikamelt 9420) with an elongation at break of approximately 50-60% is mixed in weight proportions 60:40, 65:35, 70:30 (the polyester hot melt mentioned first, respectively) with a polyamide hot melt (Henkel Macromet 6208) with a melting temperature between 188 and 195° and a density of 1.02 g/cm³ as in example 1 and tested with regard to stringing tendency.

In example 3, a hot melt drop remains on the round metal rod into which the string formed directly after pulling out the round metal rod from the melt retracts completely or partially, depending on the mixing ratio. The effect is in this context significantly less pronounced than in the application of the two hot melts when used separately.

Example 4

The polyester hot melt of example 2 and a polyamide hot melt with a density of 0.97 g/cm³, a softening point of 190-205° C. (Henkel Macromet 2035) are mixed and tested in weight proportions of 30:70, 50:50, and 70:30 in analogy to example 1. In example 4, a hot melt drop remains on the round metal rod into which the string that is formed directly after pulling out the round metal rod from the melt retracts. A residual string cannot be detected or is significantly smaller than in application of the two hot melts when used separately, wherein the stringing tendency increases again beginning at a weight proportions of 70% of the aforementioned polyester. The stringing tendency is therefore evaluated as minimal.

What is claimed is:

1. A filter element comprising:
a filter body of at least one layer of a flat web-shaped filter medium, the web-shaped filter medium separating a raw side from a clean side of the filter element;
a hot melt system;
wherein the filter body is glued together by the hot melt system;
wherein the hot melt system comprises a hot melt mixture and the hot melt mixture comprises:
30-70% by weight of a first hot melt that is polyester-based, the polyester-based first hot melt having a total proportion of adipic acid added into composition forming the first hot melt of >5% by weight and <35% by weight;
30-70% by weight of a second hot melt that is polyamide-based, the polyamide-based second hot melt having a total proportion of adipic acid added into composition forming the second hot melt of >5% by weight and <35% by weight;
wherein the added adipic acid added to the polyester-based first hot melt and added to the polyamide-based second hot melt reduces stringing tendency and improves the heat resistance of the hot melt mixture;
wherein the first hot melt and the second hot melt together amount to 100% by weight of the hot melt mixture;
wherein the hot melt mixture constitutes a proportion of more than 75% by weight of the hot melt system;
wherein the remainder of the hot melt system is selected from the group consisting of fillers, pigments, tackiness-imparting resins, and hot melts based on a polycondensate,
wherein the hot melt system includes the tackiness-imparting resins;
wherein the tackiness-imparting resins includes a resin selected from the set including: a hydrogenated cycloaliphatic hydrocarbon resin or an aliphatic or alicyclic petroleum hydrocarbon resin,
wherein the filter body is provided on at least one surface of the flat web-shaped filter medium with a uninterrupted and sealing adhesive bead of the hot melt system,
wherein the adhesive bead glues the filter body in such a way that the raw side and the clean side of the filter element are separated seal-tightly from each other.

2. The filter element according to claim 1, wherein
wherein the tackiness-imparting resins further includes a resin selected from the set including: an aromatic, aliphatic, or cycloaliphatic hydrocarbon resin.

3. The filter element according to claim 1, wherein
the web-shaped filter medium is a zigzag-folded filter medium sheet that is formed to an annular filter bellows of a closed ring shape constituting the filter body,
wherein the adhesive bead is applied to two oppositely positioned end sections of the filter medium sheet, the end sections extending parallel to fold edges of the zigzag-folded filter medium sheet,
wherein the adhesive bead extends along end edges of the end sections and seal-tightly connects the end sections to form the closed ring shape.

4. The filter element according to claim 3, wherein
the adhesive bead extends between the end edges and the fold edges that are closest to the end edges.

5. The filter element according to claim 4, wherein
the adhesive bead extends centrally between the end edges and said fold edges closest to the end edges.

6. The filter element according to claim 5, wherein
the end sections with the adhesive bead are pressed together with a corrugated profile.

7. The filter element according to claim 3, wherein
the adhesive bead extends along an entire length of the end edges.

8. The filter element according to claim 3, further comprising
end disks that are arranged at axial end faces of the annular filter bellows and seal-tightly close off the axial end faces such that the raw side is separated from the clean side,
wherein the adhesive bead is connected seal-tightly with the end disks.

9. The filter element according to claim 1, wherein
the filter body is comprised of a semi-finished product that comprises
a first layer and a second layer of the flat web-shaped filter medium resting on each other,
wherein the first layer is a flat layer and the second layer is a corrugated layer,
wherein the semi-finished product is wound or stacked so that the first and second layers alternate and between the first layer and the second layer and between the second layer and the first layer of adjacent layers of the semi-finished product channels allowing flow therethrough are formed,
wherein the first and second layers are connected to each other, respectively, by a first uninterrupted adhesive bead of the hot melt system,
wherein the first adhesive bead extends along a first edge of the first layer on a first flat side of the first layer and along a first edge of the second layer in a space between the first flat side and the second layer in a direction perpendicular to corrugations of the second layer such that the channels allowing flow therethrough are seal-tightly closed off at a first end.

10. The filter element according to claim 9, wherein
a second uninterrupted adhesive bead of the hot melt system is provided that connects the first and second layers to each other,
wherein the second adhesive bead is applied onto a second flat side of the first layer opposite the first flat side along a second edge of the first layer opposite the first edge of the first layer in a space between the second flat side and the second layer in the direction perpendicular to the corrugations such that the channels allowing flow therethrough are seal-tightly closed off at a second end opposite the first end such that the filter body has alternatingly closed-off channels.

11. The filter element according to claim 10, wherein
the semi-finished product is wound to a coil, and
wherein the first and second layers are connected to each other by at least one third adhesive bead of the hot melt system,
wherein the at least one third adhesive bead extends on a side of the first layer which is facing corrugation peaks of the corrugations of the second layer in a direction transverse to the corrugations such that the corrugation peaks resting at the first layer are glued to the first layer,
wherein a height of the at least one third adhesive bead is less than a height of the corrugations so that the channels allowing flow therethrough are not closed off by the at least one third adhesive bead.

12. The filter element according to claim 1, wherein
the filter body is formed of a semi-finished product that comprises
a first layer and a second layer of the web-shaped filter medium resting on each other,
wherein the first layer is a flat layer and the second layer is a corrugated layer,
wherein the semi-finished product is wound to a coil so that between the first and second layers channels allowing flow therethrough are formed,
wherein the first and second layers are connected to each other by at least one adhesive bead of the hot melt system,
wherein at least one adhesive bead extends on a side of the first layer which is facing corrugation peaks of corrugations of the second layer in a direction transverse to the corrugations such that the corrugation peaks resting at the first layer are glued to the first layer,
wherein a height of the at least one adhesive bead is less than a height of the corrugations so that the channels allowing flow therethrough are not closed off by the at least one adhesive bead.

13. The filter element according to claim 1, wherein
the filter body is a filter bellows,
wherein the flat web-shaped filter medium is a zigzag-folded filter medium sheet forming the filter bellows,
wherein along terminal edges of the filter medium sheet that are extending perpendicular to fold edges of folds of the filter medium sheet an uninterrupted adhesive bead of the hot melt system is provided, respectively, and laterally closes off the folds with formation of a fold pocket such that the raw side and the clean side of the filter element are separated seal-tightly from each other.

14. The filter element according to claim 13, wherein
the fold edges on at least one side of the filter bellows define a plane.

15. The filter element according to claim 14, further comprising
a seal,
wherein the seal circumferentially surrounds the plane defined by the fold edges and
seal-tightly separates the raw side from the clean side when the filter element is inserted into a filter housing.

16. The filter element according to claim 1, wherein
the filter body is a filter bellows,
wherein the web-shaped filter medium is a zigzag-folded filter medium sheet forming the filter bellows,
wherein fold edges of the filter bellows define a plane of the filter bellows,
wherein an uninterrupted adhesive bead of the hot melt system is applied onto the filter bellows in the plane of the filter bellows defined by the fold edges across several of the fold edges to stabilize the filter bellows and to keep constant a spacing between the neighboring fold edges in operation.

17. The filter element according to claim 1, further comprising
a preseparator layer,
wherein the filter body is a filter bellows,
wherein the web-shaped filter medium is a zigzag-folded filter medium sheet forming the filter bellows,
wherein the filter bellows has folds with inflow-side fold edges and outflow-side fold edges,
wherein the preseparator layer is resting on a surface of the filter bellows that is formed by the inflow-side fold edges,
wherein the filter bellows and the preseparator layer are glued together by the hot melt system.

18. The filter element according to claim 1, wherein
the hot melt system is applied in the form of adhesive dots or adhesive beads on the filter body.

19. The filter element according to claim 1, wherein
the filter body is a filter bellows,
wherein the web-shaped filter medium is a zigzag-folded filter medium sheet forming the filter bellows,
wherein the filter medium sheet has zigzag-shaped extending terminal edges defining two end faces of the filter bellows,
wherein a lateral band of a fabric or a nonwoven is applied on at least one of the end faces and is glued on by a wide flat adhesive bead of the hot melt system.

20. The filter element according to claim 19, wherein
the wide flat adhesive bead seal-tightly glues the lateral band to the at least one of the end faces such that the raw side is separated from the clean side.

21. The filter element according to claim 19, wherein
the lateral band comprises two sections that overlap each other,
wherein the two sections in the area in which the two sections overlap are glued together by an adhesive bead of the hot melt system.

22. The filter element according to claim 21, wherein
the adhesive bead connecting the two sections is a wide flat adhesive bead applied by a wide slot nozzle.

23. The filter element according to claim 1, wherein
the web-shaped filter medium is folded in a zigzag shape and comprises folds with alternating fold tips and fold bottoms,
wherein, in intermediate fold spaces between the fold tips and the fold bottoms, stabilization beads of the hot melt system are arranged,
wherein the stabilization beads extend alternatingly between the fold tips and the fold bottoms,
wherein the web-shaped filter medium has a first side facing the raw side and a second side facing the clean side of the filter element,
wherein on the first and second sides at least two adhesive beads each of the hot melt system are arranged parallel to each other and perpendicular to a direction of fold edges of the folds,
wherein the adhesive beads on the first side and/or on the second side are interrupted at regular spacings by interruptions,
wherein start and end points of the interruptions of the adhesive beads are aligned according to a plurality of straight lines.

24. The filter element according to claim 1, wherein
a total proportion of adipic acid added into the composition forming the first hot melt and the second hot melt is >5% by weight and <35% by weight.

25. The filter element according to claim 24, wherein
the total proportion of adipic acid added into the composition forming the first hot melt and the second hot melt is >10% by weight and <30% by weight.

26. The filter element according to claim 24, wherein
the total proportion of adipic acid added into the composition forming the first hot melt and the second hot melt is >15% by weight and <25% by weight.

27. A method for producing a filter element according to claim 1, the method comprising the steps of:
a. melting a first hot melt that is polyester-based and a second hot melt that is polyamide-based, b. dynamically mixing the first and the second hot melts to form a melted hot melt mixture,
c. applying the melted hot melt mixture onto a web-shaped filter medium in at least one adhesive bead,
d. hardening the at least one adhesive bead with bonding of sections of the web-shaped filter medium with other sections of said web-shaped filter medium or with sections of a second filter medium and/or with a preseparator nonwoven.

28. The method according to claim 27, further comprising mixing the first and second hot melts prior to heating and melting.

29. The method according to claim 27, wherein mixing, heating, and melting are carried out in an extruder.

30. A method of gluing filter elements by hot melt beads of a hot melt system, comprising
providing a hot melt system comprising
a hot melt mixture, the hot melt mixture comprising
30-70% by weight of a first hot melt that is polyester-based, the polyester-based first hot melt having a total proportion of adipic acid added into composition forming the first hot melt of >5% by weight and <35% by weight; and
30-70% by weight of a second hot melt that is polyamide-based, the polyamide-based second hot melt having a total proportion of adipic acid added into composition forming the second hot melt of >5% by weight and <35% by weight,
wherein the added adipic acid added to the polyester-based first hot melt and added to the polyamide-based second hot melt reduces stringing tendency and improves the heat resistance of the hot melt mixture;
wherein the first hot melt and the second hot melt together amount to 100% by weight of the hot melt mixture;
wherein the hot melt mixture constitutes a proportion of more than 75% by weight of the hot melt system;
wherein the remainder of the hot melt system is selected from the group consisting of fillers, pigments, tackiness-imparting resins, and hot melts based on a polycondensate,
wherein the hot melt system includes the tackiness-imparting resins;
wherein the tackiness-imparting resins includes a resin selected from the set including: a hydrogenated cycloaliphatic hydrocarbon resin or an aliphatic or alicyclic petroleum hydrocarbon resin.

31. The method according to claim 30, wherein the hot melt mixture constitutes a proportion of more than 85% by weight of the hot melt system.

32. The method according to claim 31, wherein the hot melt mixture constitutes a proportion of more than 95% by weight of the hot melt system.

33. The method according to claim 30, wherein the filler is chalk and the pigment is titanium dioxide.

* * * * *